(12) United States Patent
Yonemitsu et al.

(10) Patent No.: US 7,859,593 B2
(45) Date of Patent: Dec. 28, 2010

(54) IMAGING BLOCK AND IMAGING APPARATUS

(75) Inventors: Tetsumasa Yonemitsu, Kanagawa (JP); Kiyoshi Harada, Kanagawa (JP)

(73) Assignee: Sony Corporation, Tokyo (JP)

( * ) Notice: Subject to any disclaimer, the term of this patent is extended or adjusted under 35 U.S.C. 154(b) by 401 days.

(21) Appl. No.: 12/050,357

(22) Filed: Mar. 18, 2008

(65) Prior Publication Data
US 2008/0231723 A1    Sep. 25, 2008

(30) Foreign Application Priority Data
Mar. 19, 2007  (JP) .......................... P2007-070958

(51) Int. Cl.
*H04N 5/225* (2006.01)
*H04N 13/00* (2006.01)
*H04N 5/235* (2006.01)

(52) U.S. Cl. ..................... 348/375; 348/374; 348/45; 348/222.1

(58) Field of Classification Search .................. None
See application file for complete search history.

(56) References Cited

U.S. PATENT DOCUMENTS 5,910,816 A * 6/1999 Fontenot et al. ............... 348/65
6,956,610 B1 * 10/2005 Walls ......................... 348/340
7,126,101 B2 * 10/2006 Yamaguchi ............... 250/208.1
7,557,860 B2 * 7/2009 Frith ......................... 348/374

FOREIGN PATENT DOCUMENTS

JP          7 313453        12/1995

* cited by examiner

*Primary Examiner*—Luong T Nguyen
(74) *Attorney, Agent, or Firm*—Frommer Lawrence & Haug LLP; William S. Frommer

(57) ABSTRACT

An imaging block includes a prism, first and second imaging devices, an analog/digital convertor, a timing generator, and first, second, third circuit boards. The prism separates light incident through a lens into at least two colors and outputs the light. The first and second imaging devices are each generates a video signal by photoelectrically converting the light. The analog/digital converter converts the video signal output from each of the devices into a digital signal. The timing generator generates a video-signal processing clock for driving the first imaging device, the second imaging device, and the analog/digital converter. The first imaging device is mounted on the first circuit board. The analog/digital converter and the timing generator are mounted on the second circuit board. The second imaging device is mounted on third circuit board and connected to both the first circuit board and the second circuit board through a cable.

8 Claims, 6 Drawing Sheets

IMAGING BLOCK AND IMAGING APPARATUS

CROSS REFERENCES TO RELATED APPLICATIONS

The present invention contains subject matter related to Japanese Patent Application JP 2007-070958 filed in the Japanese Patent Office on Mar. 19, 2007, the entire contents of which being incorporated herein by reference.

BACKGROUND OF THE INVENTION

1. Field of the Invention

The invention relates to an imaging block suitably applicable to an endoscope or the like and to an imaging apparatus including such an imaging block.

2. Description of the Related Art

For obtaining high-definition pictures with imaging apparatuses using imaging devices such as CCDs (Charge Coupled Devices) and CMOSs (Complementary Metal Oxide Semiconductors), it is important to faithfully transmit video signals obtained with the imaging devices as far as possible with respect to phases, frequencies, and so on.

However, in recent years, a high-definition and small-sized imaging apparatus has been desired, and therefore a high clock frequency is used in a system of signal processing circuit. Thus, phase differences, deterioration of frequency characteristics and so on may largely affect the quality of signals. Accordingly, various procedures have been devised for preventing such phase differences and deterioration of frequency characteristics.

Japanese Unexamined Patent Application Publication No. H07-313453 discloses an endoscope including an imaging device in which signal transmission is carried out using a flexible print board with a noise-shielding performance.

SUMMARY OF THE INVENTION

For example, if an imaging device and an analog/digital converter (hereinafter, referred to as A/D converter) for converting a video signal obtained with the imaging device into a digital signal are arranged apart from each other, an analog signal is transmitted a long distance. In such case, signals output from another neighboring circuit may become noise and have a high probability of coupling into analog signals.

In the case where the transmission path of an analog signal is long, the phase and frequency characteristics of the signal may be often deteriorated during the signal transmission, causing resolution to be deteriorated. In particular, when CCD is used as an imaging device and a 3-chip imaging system is employed, the electrical fixing precision of three CCDs may decrease due to deterioration in the phase and frequency characteristics of the analog signal.

In addition, the area of a circuit board may be reduced to satisfy the request for obtaining a small-sized imaging apparatus. However, in the case of arranging another circuit, such as an A/D converter, on the circuit board where the imaging device is mounted, the circuit board may need to be large.

It is desirable to provide an imaging block and an imaging apparatus which are small-sized and capable of preventing video signals from deteriorating.

According to an embodiment of the invention, there is provided an imaging block and according to another embodiment of the invention, there is provided an imaging apparatus. The imaging block and imaging apparatus each include a prism, a first imaging device, a second imaging device, an analog/digital converter, and a timing generator. The prism is configured to separate light incident through a lens into at least two colors and output the light. The first imaging device and the second imaging device are configured to generate video signals by photoelectrically converting the separated light output from the prism, respectively. The analog/digital converter is configured to convert the video signals output from the first and second imaging devices into digital signals. The timing generator is configured to generate a video-signal processing clock for driving the imaging devices and the analog/digital converter. The imaging block and imaging apparatus each further include a first circuit board on which the first imaging device is mounted, a second circuit board on which the analog/digital converter and the timing generator are mounted, and a third circuit board, on which the second imaging device is mounted, electrically connected to both the first and second circuit boards. Furthermore, the second circuit board is arranged such that a surface thereof can be substantially perpendicular to a surface of the first circuit board and a surface of the third circuit board. In addition, the analog/digital converter and the timing generator are mounted on another surface of the second circuit board, which is opposite to the surface on the side where both the first and third circuit boards are arranged.

Accordingly, both the analog/digital converter and the timing generator are allowed to be arranged on the second circuit board. Here, the second circuit board is arranged substantially perpendicular to the first circuit board and the third circuit board, on which the respective imaging devices are mounted. Thus, the analog/digital converter and the timing generator are arranged on the rear of the side where the first circuit board and the second circuit board are arranged.

According to the above embodiments of the invention, the analog/digital converter is not arranged on any of the first circuit board and the third circuit board, which are fixed to the prism, so that the area of the circuit board can be restricted. In addition, the timing generator and the imaging device are arranged on the sides opposite to each other, so that signals from the timing generator can be prevented from coupling into video signals obtained from the imaging devices as noise.

BRIEF DESCRIPTION OF THE DRAWINGS

FIG. 3A is a perspective view of the imaging block and FIG. 3B is another perspective view thereof, which are viewed from different angles.

FIG. 4A is a perspective view of the circuit board in an extended state and FIG. 4B is a perspective view of the circuit board in a folded state.

DESCRIPTION OF THE PREFERRED EMBODIMENTS

Hereinafter, an embodiment of the invention will be described with reference to the attached drawings.

Figure 1:
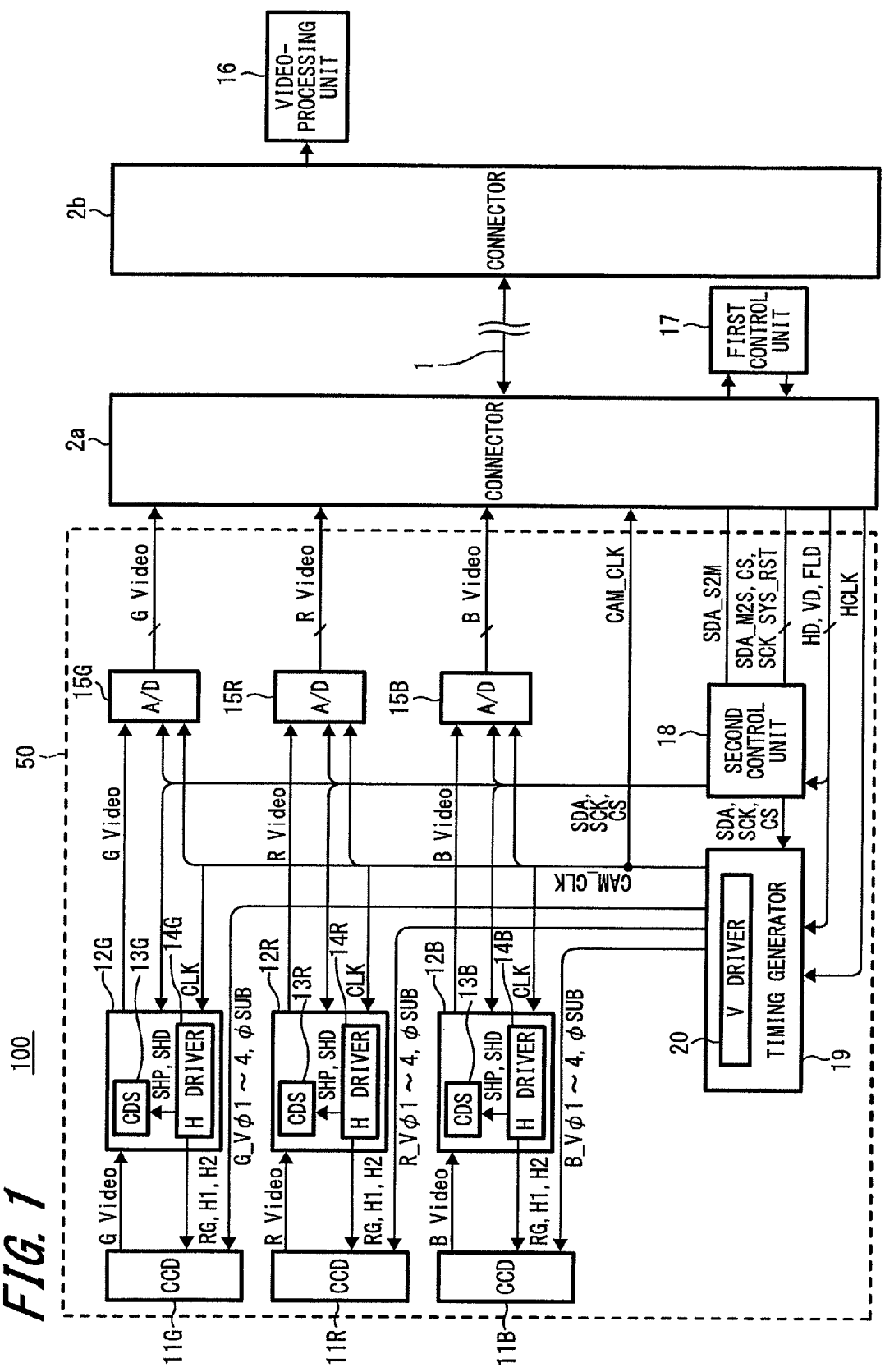
FIG. 1 is a block diagram illustrating an exemplified internal configuration of an imaging apparatus according to an embodiment of the invention.

FIG. 1 illustrates an exemplified configuration of an imaging apparatus according to an embodiment of the invention. An imaging apparatus 100 of the embodiment is applicable to imaging apparatuses used in various applications, such as a medical endoscope. The imaging apparatus 100 illustrated in FIG. 1 employs a 3-chip imaging system and includes three CCD imaging devices (hereinafter, simply referred to as imaging devices) 11G, 11R, 11B. The respective CCDs 11G, 11R, 11B generate electric signals by photoelectrically converting respective light beams G (green), R (red), and B (blue) separated with a color-separation prism (not shown) from light passing through a lens (not shown). Furthermore, the imaging apparatus 100 includes a vertical transfer driver (hereinafter, referred to as a V driver) 20 and a horizontal transfer drivers (hereinafter, referred to as H drivers) 14G, 14R, 14B. The V driver 20 vertically transfers signal electric charges photoelectrically converted and accumulated in the respective CCDs 11G, 11R, 11B. The H drivers 14G, 14R, 14B horizontally transfer signal electric charges vertically transferred from the V driver 20.

The V driver 20 supplies vertical transfer pulses $V\phi1$ to $V\phi4$ to the CCDs 11G, 11R, 11B, respectively. The H drivers 14G, 14R, 14B supply horizontal transfer pulses H1 and H2 to the CCDs 11G, 11R, 11B, respectively. In addition, the H drivers 14G, 14R, 14B supply reset pulses RG to reset the signal charges accumulated in the CCDs 11G, 11R, 11B, respectively. These pulses applied to the CCDs 11G, 11R, 11B are generated in synchronization with video sync clock (CAM_CLK) supplied from a timing generator 19.

Upon receiving reference clock (HCLK) supplied from a first control unit 17 for controlling respective units in the imaging apparatus 100, the timing generator 19 generates video sync clock (CAM_CLK) for driving the CCDs 11G, 11R, 11B, the V driver 20, the H drivers 14G, 14R, 14B, and later-described CDS circuits 13G, 13R, 13G and analog/digital converters (A/D converters) 15G, 15R, 15B and then supplies the video sync clock (CAM_CLK) to them, respectively. The video sync clock has a frequency for video-signal processing in synchronization with the horizontal frequency and the vertical frequency of the video signal.

Signal charges obtained from CCDs 11G, 11R, 11B are read by the above-described V driver 20 and H drivers 14G, 14R, 14B and then converted to voltages corresponding to the signal charges at an output circuit (not shown), followed by being supplied to CDS (Correlated Double Sampling) circuits 13G, 13R, 13B, respectively.

The CDS circuits 13G, 13R, 13B carry out sampling of respective output signals obtained from the CCDs 11G, 11R, 11B to reduce reset noises included in the signals. The video signals output from the CDS circuits 13G, 13R, 13B are supplied to the A/D converters 15G, 15R, 15B after being adjusted to constant signal levels in an AGC (Automatic Gain Control) circuit (not shown). The A/D converters 15G, 15R, 15B convert video signals (analog signals) into digital signals, respectively.

A block (hereinafter, referred to as a camera block 50) on which the above-described optical system, CCDs 11G, 11R, 11B, CDSs 13G, 13R, 13B, and other circuits are mounted is provided on a circuit board separated and distant from a board on which a video-processing unit 16 carrying out image-processing of video signals output from the block is provided. The camera block 50 is connected to the block, on which the video-processing unit 16 is mounted, through a cable 1 connecting a connector 2a on the side of the camera block 50 and a connector 2b on the side of the video-processing unit 16. The video-processing unit 16 carries out feed-back clamp processing of fixing a black level OB (optical black) at a predetermined standard value, knee correction for compressing a signal of a certain level or more, gamma correction for carrying out correction according to a gamma curve where the level of the video signal is defined, white-dip processing for correcting white balance, and so on.

The connector 2a of the camera block 50 is also connected to the first control unit 17 that controls each unit of the imaging apparatus 100. The first control unit 17 includes a micro computer or the like. In this embodiment, for reducing the amount of signals transmitted from the first control unit 17 to the respective units in the camera block 50, a second control unit 18 is installed in the camera block 50. The second control unit 18 translates a setup instruction command to each unit in the camera block 50 among commands transmitted from the first control unit 17 and transmits such command to each unit.

The second control unit 18 carries out, for example, control of changing shutter speed for the timing generator 19, gain control and switching instruction of video rates (such as 50i/60i) for the A/D converters 15G, 15R, 15B. In addition, for lowering the power consumption of the imaging apparatus 100, the second control unit 18 may control the respective units in the camera block 50 to independently switch to a standby mode or control the settings of respective units to be periodically initialized.

Figure 2:
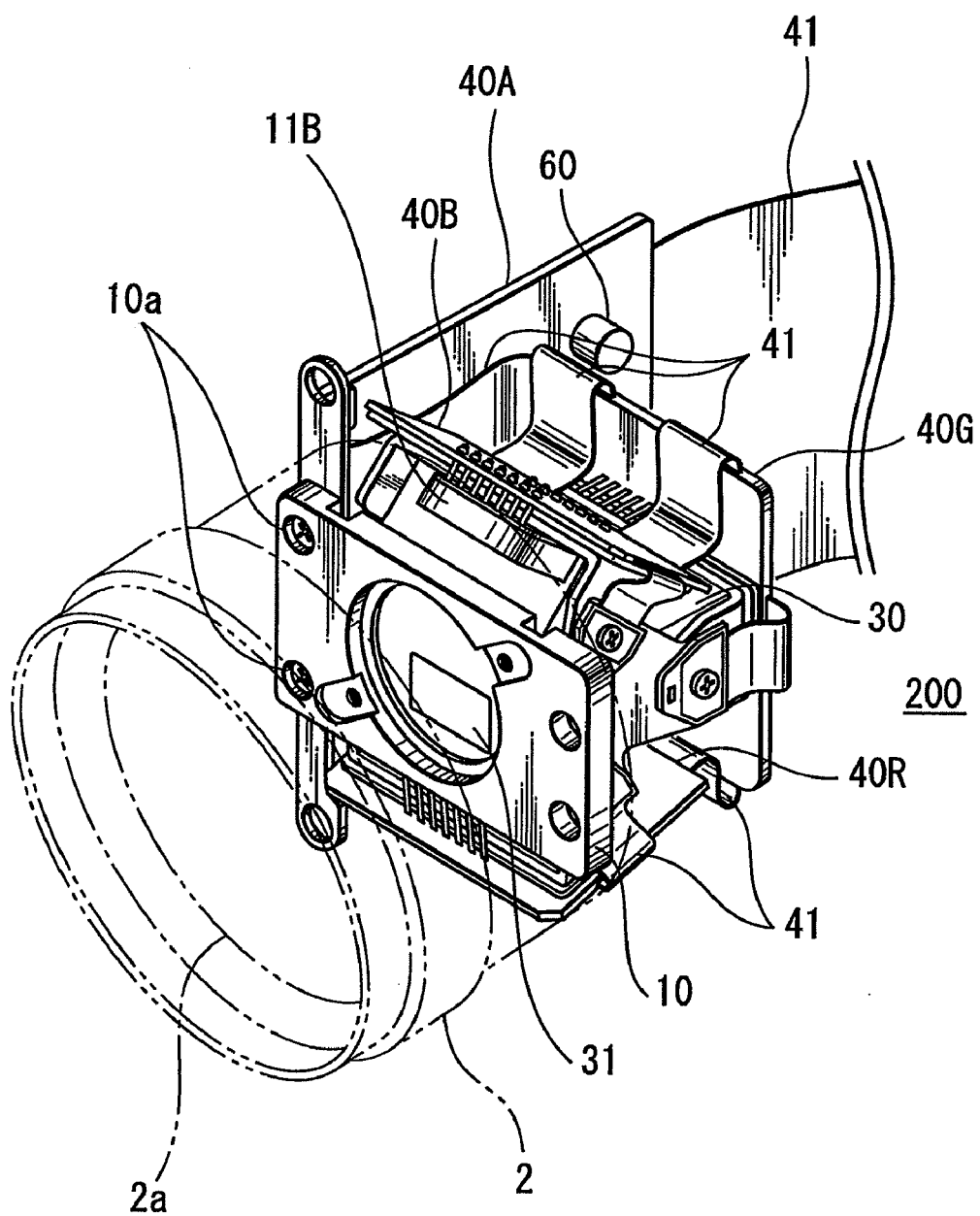
FIG. 2 is a perspective view illustrating an exemplified configuration of an imaging block according to an embodiment of the invention.

Subsequently, referring to FIG. 2, an exemplified configuration of an imaging block 200 including a color separation prism 30, the imaging devices 11G, 11R, 11B, and so on will be described. FIG. 2 is a perspective view showing the light incident side of the image block 200. The imaging block 200 is connected to a lens block 2 represented by the broken line in FIG. 2 through a lens-mounting base 10. As shown in the figure, a positioning hole 10a is formed in the lens-mounting base 10. The lens block 2 and the imaging block 200 can be fixed together with high dimensional accuracy using a screw inserted in the hole 10a.

The lens-mounting base 10 is provided with a window 31 on which subject light passing through a lens 2a of the lens block 2 is incident. The color separation prism 30 is fixed to the rear of the lens-mounting base 10 in the forward direction of the subject light. The prism 30 separates the subject light incident from the window 31 into three color light beams, R, G, and B.

The color separation prism 30 includes a block for transmitting the B light beam, a block for transmitting the R light beam, and a block for transmitting the G light beam. The imaging device 11B for photoelectrically converting the B light beam, the imaging device 11G for photoelectrically converting the G light beam, and the imaging device 11R for photoelectrically converting the R light beam are fixed to three output surfaces of the respective blocks from which the respective rays of light separated into R, G, and B are output. The imaging device 11B alone is illustrated in FIG. 2. The imaging devices 11R and 11G are not illustrated in the figure.

As shown in FIG. 2, a circuit board 40A (second circuit board) is arranged at the position substantially perpendicular to circuit boards 40B, 40G, 40R, respectively. In addition, a power-decoupling capacitor 60 is arranged on the circuit board 40A. Furthermore, the A/D converters 15R, 15G, 15B, second control unit 18, timing generator 19, and so on are arranged on the rear surface of the circuit board 40A. The arrangement of the respective units on the rear surface of the circuit board 40A will be described later in detail.

Figure 3A:
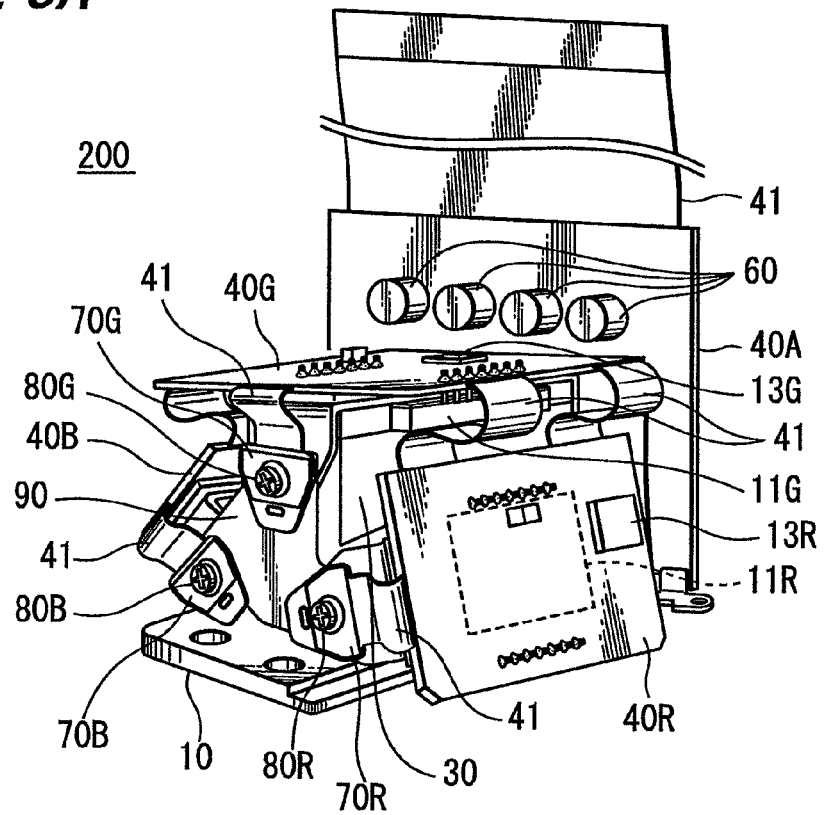
FIGS. 3A and 3B are diagrams illustrating an exemplified configuration of an imaging block according to an embodiment of the invention, where
Figure 3B:
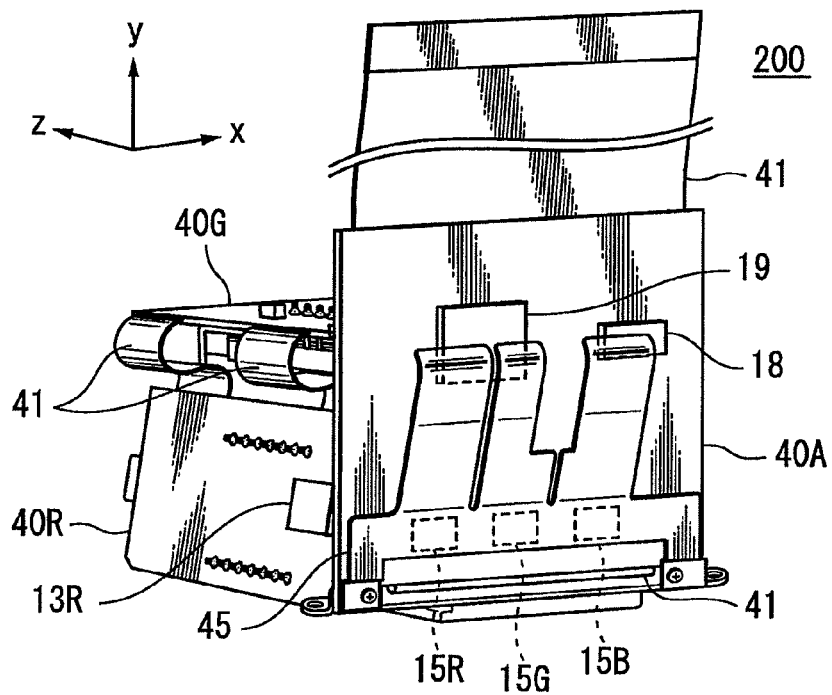

FIGS. 3A and 3B are diagrams illustrating an exemplified configuration of the imaging block 200 when the window 31 faces downward. FIG. 3A is a perspective view showing the surface of the circuit board 40A facing forward on which the decoupling capacitor 60 is arranged and FIG. 3B is a perspective view of the rear surface of the circuit board 40A.

The imaging devices 11B, 11G, 11R fixed on three respective output surfaces of the color separation prism 30 are connected to the circuit board 40B (first circuit board), the circuit board 40G (third circuit board), and the circuit board 40R (first circuit board), respectively. The respective imaging devices are connected to the circuit boards by soldering the terminals of the imaging devices to the rear surfaces of the respective circuit boards 40B, 40G, 40R.

The CDS circuits 13B, 13G, 13R are arranged on the other surfaces of the respective circuit boards 40B, 40G, 40R, on which the imaging devices 11B, 11G, 11R are not connected. In addition, the respective circuit boards 40 are electrically connected to one another through a flexible cable 41 that is a circuit board with flexibility.

Ground boards 70B, 70G, 70R are also connected to the flexible cable 41, respectively. In addition, the ground boards 70B, 70G, 70R are contacted with a conductive plate 90 made of a copper foil or the like. The ground boards 70B, 70G, 70R are fixed to the conductive plate 90 using screws 80B, 80G, 80R, respectively.

Next, referring to FIG. 3B, the arrangement of the respective units on the rear surface of the circuit board 40A will be described. As shown in FIG. 3B, the timing generator 19, the second control unit 18, the A/D converters 15R, 15G, 15B are arranged on the circuit board 40A in the order from the upper left. The A/D converters 15R, 15G, 15B are contacted with a hear sink 45 to deal with radiated heat. The A/D converters 15R, 15G, 15B are arranged in the vicinity of the end of the circuit board 40A as shown in FIG. 3B. The flexible cable 41 connected to the end of the circuit board 40A is connected to the circuit board 40G on which the imaging device 11G and the CDS circuit 13G are mounted. Such arrangement allows signals output from the CDS circuits 13R, 13G, 13B to be transmitted to the A/D converters 15R, 15G, 15B through short paths, respectively.

Figure 4A:
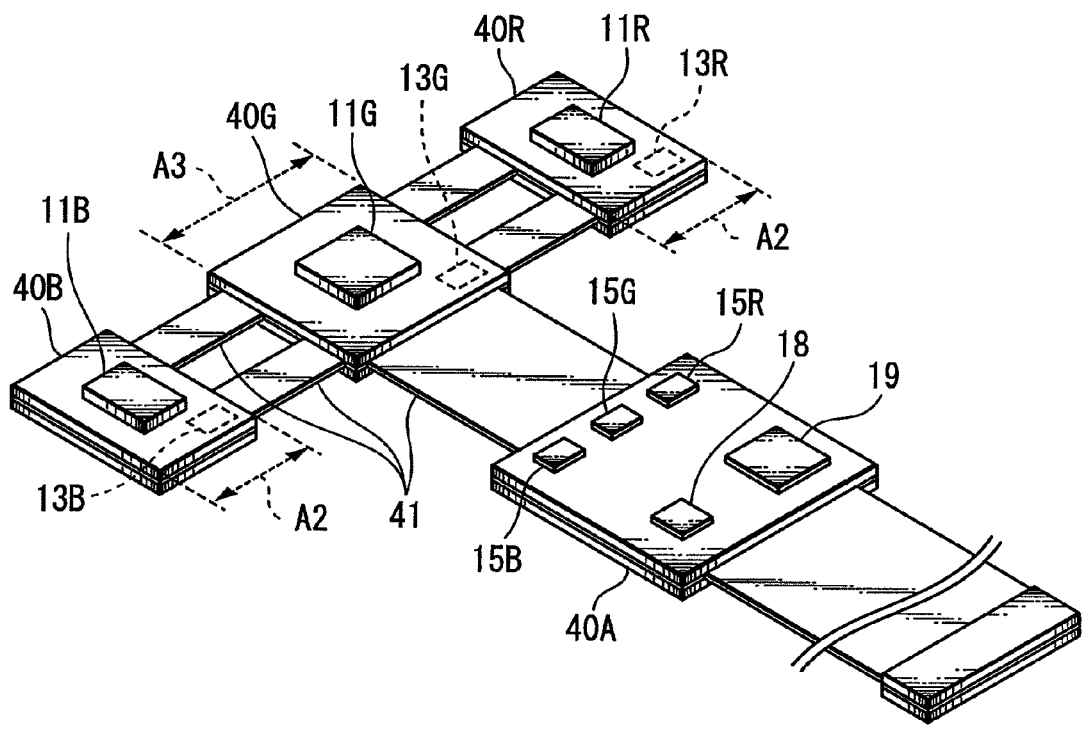
FIGS. 4A and 4B are diagrams illustrating an exemplified arrangement of circuit boards according to an embodiment of the invention, where
Figure 4B:
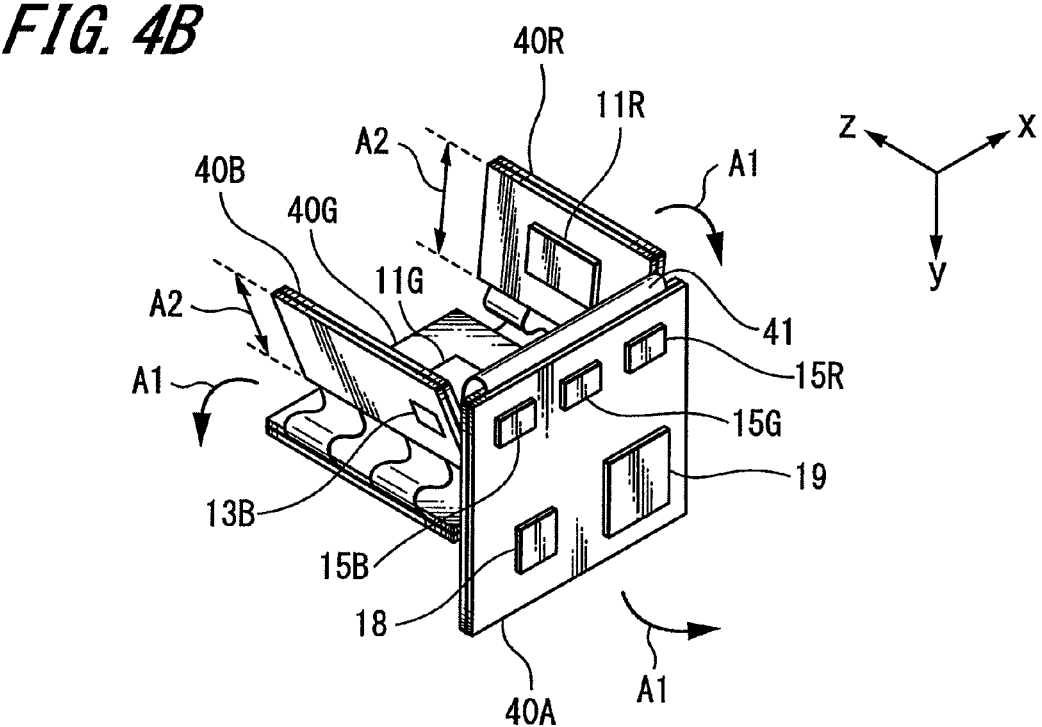

Subsequently, referring to FIGS. 4A and 4B, an exemplified arrangement of each of the circuit boards 40A, 40B, 40G, 40R will be described. FIG. 4A illustrates that the respective circuit boards 40A, 40B, 40G, 40R fixed to the color separation prism 30 as shown in FIGS. 2 and 3 are laid out and arranged on the same plane. The arrangement of the respective circuit boards 40 shown in FIG. 4A corresponds to the arrangement of the respective circuit boards 40 before being laid out as shown in FIG. 4B. The state shown in FIG. 4A can be attained by stretching each circuit board 40 in the direction indicated by the arrow A1 in FIG. 4B. As shown in FIG. 4B, the color separation prism 30, the conductive plate 90, and so on are not illustrated in the figure for the convenience of explanation.

As shown in FIG. 4A, the circuit board 40R mounting the imaging device 11R, the circuit board 40G mounting the imaging device 11G, and the circuit board 40B mounting the imaging device 11B are connected to one another through the flexible cable 41, respectively. The circuit boards 40R, 40G, 40B are aligned with the circuit board 40G in the center thereof. In addition, the circuit board 40A is connected to the circuit board 40G arranged in the center through the flexible cable 41. The circuit board 40A is connected to the circuit board 40G such that it can be arranged substantially at a right angle with the aligned circuit boards 40R, 40G, 40B. In other words, the aligned circuit boards 40R, 40G, 40B form a T-shape with the circuit board 40A.

The CDS circuits 13R, 13G, 13B are arranged on the surfaces of the respective circuit boards 40R, 40G, 40B on the other sides where the imaging devices 11R, 11G, 11B are not arranged. Signals output from the CDS circuits 13R and 13B are transmitted to the A/D converters 15R, 15G, 15B on the circuit board 40A after passing through the circuit board 40G located in the center of the circuit arrangement.

The circuit boards 40B and 40R have a defined side length as indicated by the arrow A2 as shown in FIGS. 4A and 4B. This length corresponds to the height of the output surface of the color separation prism 30 (see FIG. 3) from which color-separated light is output, so that it can be severely limited in design. In contrast, the circuit board 40G has a side length indicated by the arrow A3 as shown in FIG. 4A which is not severely limited in design. Thus, the area of the circuit board 40G may be larger than that of the other circuit boards. Hence, the circuit board 40G is configured to once correct signals from the circuit boards 40R and 40B and then transmit the signals to the circuit board 40A. Thus, the dimensions of the circuit board A can also be designed to be small.

Figure 5A:
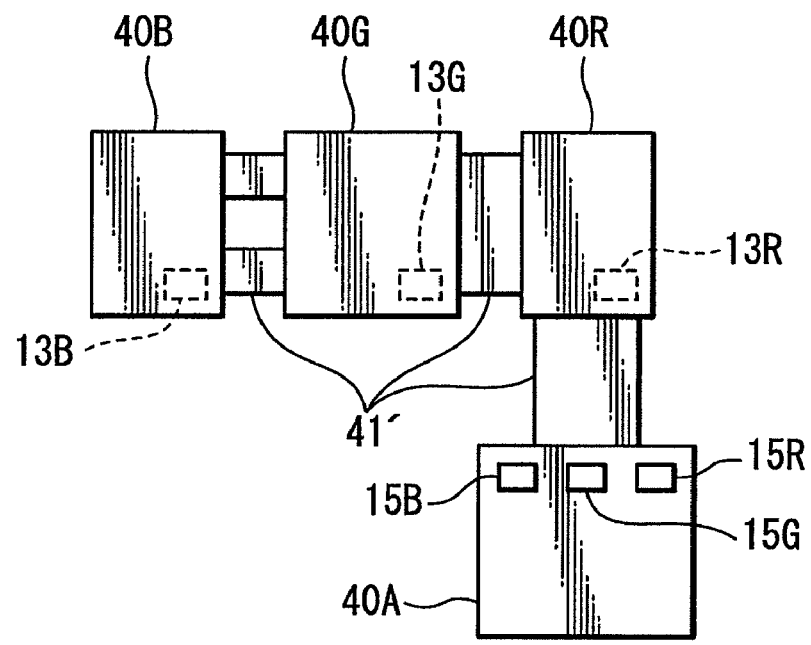
FIGS. 5A and 5B are diagrams illustrating an exemplified arrangement of circuit boards according to another embodiment of the invention.

As shown in FIG. 5A, it should be noted that the circuit board 40A with the mounted A/D converters 15R, 15G, 15B may be connected to the circuit board at the end (40R in FIG. 5A) among the circuit boards 40R, 40G, 40B aligned. When these circuit boards are arranged in such L-shape, the lengths of the transmission path from the circuit board 40A to the aligned respective circuit boards 40B, 40G, 40R may vary. As shown in FIG. 5A, the distance between the circuit board 40B and the circuit board 40A is long, while the distance between the circuit board 40R and the circuit board 40A is short. Therefore, the phase characteristics and the frequency characteristics of signals transmitted from the respective circuit boards 40B, 40G, 40R may vary, which is unfavorable.

Furthermore, when the respective circuit boards 40A, 40B, 40G, 40R as illustrated in FIG. 5A are assembled, it is difficult to bend a flexible cable 41' connecting the circuit board 40R and the circuit board 40A. The circuit boards 40R and 40A may have increased stress, resulting in misalignment thereof.

Figure 5B:
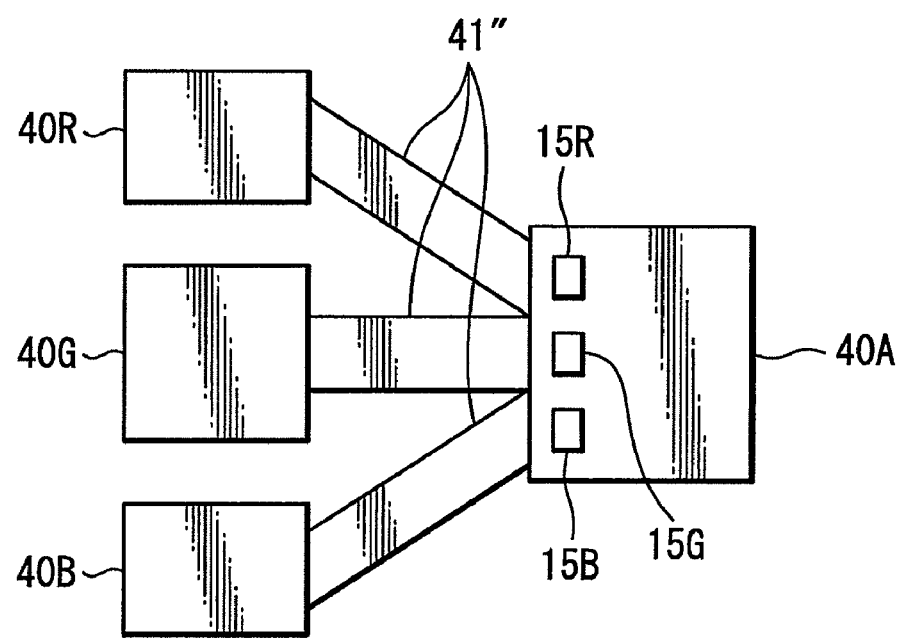

Furthermore, as shown in FIG. 5B, when the circuit boards 40R, 40G, 40B are respectively connected to the circuit board 40A through flexible cables 41", the circuit boards 40R, 40G, 40B may not share the supply from a common power source. In other words, the circuit boards 40R, 40G, 40B may independently receive power from the circuit board 40A, so that the width of each flexible cable 41" may be large. Accordingly, a large area may be necessary for the circuit board 40A. Furthermore, similar to the case shown in FIG. 5A, the flexible cables 41" are difficult to bend, so that the respective circuit boards 40A, 40B, 40G, 40R may be affected by increasing stress.

In other words, according to the embodiment of the invention, power supplied from the circuit board 40A is temporally supplied to the circuit board 40G and then distributed to the circuit board 40R and the circuit board 40B. Therefore, the width of the flexible cable 41 connecting the circuit board 40G and the circuit board 40A may be short. As a result, the area of the circuit board 40A can be reduced.

Furthermore, according to the embodiment of the invention, the respective circuit boards 40A, 40B, 40G, 40R may be arranged as shown in FIG. 4A to shorten the transmission distance from the CDS circuits 13R, 13G, 13B to the A/D converter 15R, 15G, 15B. Therefore, the phase characteristics and frequency characteristics of analog video signals can be prevented from deteriorating.

Furthermore, according to the embodiment of the invention, the A/D converters 15R, 15G, 15B, the second control unit 18, the timing generator 19, and so on are arranged on the circuit board 40A having no limitation to the height of the surface of the color separation prism 30 from which color-separated light is output. Therefore, the entire imaging apparatus 100 can be small-sized.

Figure 6:
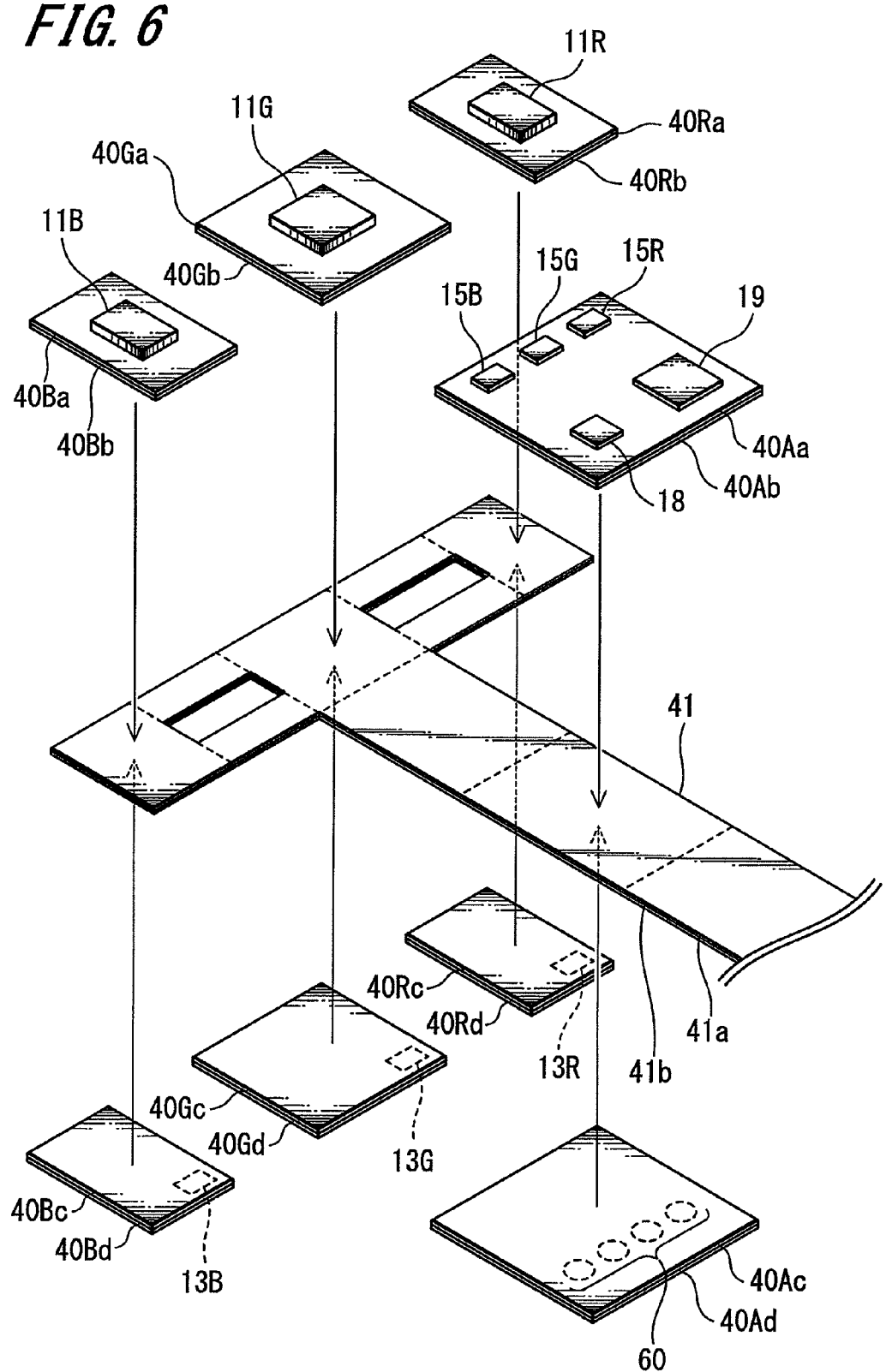
FIG. 6 is an exploded perspective view illustrating an exemplified configuration of each layer of the circuit boards according to an embodiment of the invention.

Furthermore, according to the embodiment of the invention, a ground layer is arranged on the rear side of the surface on which an analog transmission circuit is mounted to further prevent analog video signals from receiving noise. FIG. 6 is an exploded view showing each layer of the circuit boards 40A, 40B, 40G, 40R and the flexible cable 41 while the respective circuit boards are laid out as shown in FIG. 4A.

According to the embodiment, the flexible cable 41 is formed of a single plate including two layers, that is, a ground layer 41a and a signal layer 41b. Each of these layers, the ground layer 41a and the signal layer 41b, is connected to the circuit boards 40R, 40G, 40B. The circuit boards 40R, 40G, 40B arranged on the ground layer 41a are made of two layers: signal layers 40Ra and 40Rb, signal layers 40Ga and 40Gb, and signal layers 40Ba and 40Bb, respectively. The circuit boards 40R, 40G, 40B arranged on the signal layer 41b are made of two layers: signal layers 40Rc and 40Rd, signal layers 40Gc and 40Gd, and signal layers 40Bc and 40Bd, respectively.

According to the embodiment, circuits for analog-signal transmission, such as the imaging devices 11R, 11G, 11B and the AD converters 15R, 15G, 15B, are arranged on the ground layer 41a of the flexible cable 41. In addition, the CDS circuits 13R, 13G, 13B and the power-decoupling capacitor 60 are arranged on the signal layer 41b of the flexible cable 41.

According to the above-described configuration, the ground layer 41a shields the analog-signal transmission circuits. Thus, noise can be prevented from coupling with analog video signals. Also, the frequency characteristics and the phase characteristics of analog video signals can be prevented from deteriorating.

Furthermore, the respective circuits are mounted on the both sides of the flexible cable 41 in the arrangement as illustrated in FIG. 6. Thus, in the assembled state as shown in FIG. 4B, digital circuits, such as the second control unit 18 and the timing generators 19, are arranged on the surface rear to the side where the imaging devices 11R, 11G, 11B are arranged on the circuit boards 40R, 40G, 40B, respectively. Therefore, the possibility of noise from the digital circuits to the imaging devices 11R, 11G, 11B becomes low, so that signals output from the respective imaging devices 11R, 11G, 11B may have favorable characteristics with less influence of noise.

Furthermore, according to the above-described embodiment, the CDS circuits 13R, 13G, 13B are mounted on the surfaces opposite to those on which the imaging devices 11R, 11G, 11B are mounted respectively. Alternatively, the CDS circuits may be arranged on the same surface on which the respective imaging devices 11R, 11G, 11B are arranged.

Furthermore, the above-described embodiment of the invention has been applied to the imaging apparatus provided with three imaging devices. However, an applicable apparatus is not limited to such imaging apparatus. An embodiment of the invention can be applied to any of other apparatuses in the case where the apparatus includes a plurality of sensor devices and intends to decrease the deterioration of the phase and frequency characteristics of signals transmitted between circuits.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging block comprising;
   a prism configured to separate light incident through a lens into at least two colors and output the light;
   a first imaging device and a second imaging device each configured to generate a video signal by photoelectrically converting the separated light output from the prism;
   an analog/digital converter configured to convert the video signal output from each of the first imaging device and the second imaging device into a digital signal;
   a timing generator configured to generate video-signal processing clock for driving the first imaging device, the second imaging device, and the analog/digital converter;
   a first circuit board on which the first imaging device is mounted;
   a second circuit board on which the analog/digital converter and the timing generator are mounted; and
   a third circuit board, on which the second imaging device is mounted, connected to both the first circuit board and the second circuit board through a cable,
   wherein the first imaging device mounted on the first circuit board and the second imaging device mounted on the third circuit board are fixed to output surfaces of the prism,
   wherein the second circuit board is arranged so that a surface of the second circuit board is substantially perpendicular to a surface of the first circuit board and a surface of the third circuit board, and
   wherein the analog/digital converter and the timing generator are mounted on another surface of the second circuit board opposite to the surface of the second circuit board on the side where the first circuit board and the third circuit board are arranged.

2. An imaging block according to claim 1, wherein
   the first circuit board is connected to the second circuit board substantially at a right angle, with the third circuit board at the center, in a state in which the first circuit board, the second circuit board and the third circuit board are laid out.

3. An imaging block according to claim 2, wherein
   the length of the third circuit board in a widthwise direction is longer than the length of the first circuit board in the widthwise direction.

4. An imaging block according to claim 2, wherein
   the analog/digital converter is arranged at the end of the second circuit board on the side thereof wired with the cable for connecting to the third circuit board.

5. An imaging block according to claim 2,
   wherein the cable is a flexible cable including two layers of a ground layer and a signal layer, and
   wherein the first circuit board, the second circuit board, and the third circuit board are arranged on a surface of both the ground layer and the signal layer.

6. An imaging block according to claim 5, wherein
   the analog/digital converter and the timing generator mounted on the second circuit board are arranged on the side of the ground layer of the flexible cable.

7. An imaging block according to claim 6, wherein a power decoupling circuit is arranged on the second circuit board arranged on the side of the signal layer of the flexible cable.

8. An imaging apparatus comprising:

a prism configured to separate light incident through a lens into at least two colors and output the light;

a first imaging device and a second imaging device each configured to generate a video signal by photoelectrically converting the separated light output from the prism;

an analog/digital converter configured to convert the video signal output from each of the first imaging device and the second imaging device into a digital signal;

a timing generator configured to generate a video-signal processing clock for driving the first imaging device, the second imaging device, and the analog/digital converter;

a first circuit board on which the first imaging device is mounted;

a second circuit board on which the analog/digital converter and the timing generator are mounted; and a third circuit board, on which the second imaging device is mounted, connected to both the first circuit board and the second circuit board through a cable, wherein the first imaging device mounted on the first circuit board and the second imaging device mounted on the third circuit board are fixed to output surfaces of the prism, wherein the second circuit board is arranged so that a surface of the second circuit board is substantially perpendicular to a surface of the first circuit board and a surface of the third circuit board, and wherein the analog/digital converter and the timing generator are mounted on another surface of the second circuit board opposite to the surface of the second circuit board on the side where the first circuit board and the third circuit board are arranged.

* * * * *